United States Patent [19]

Matsunaga et al.

[11] Patent Number: 5,158,002

[45] Date of Patent: Oct. 27, 1992

[54] SHIFTABLE DRIVE TURRET SLITTER

[75] Inventors: Douglas S. Matsunaga, Vernon Hills; Paul F. Kulczewski, Villa Park, both of Ill.

[73] Assignee: Braner, Inc., Schiller Park, Ill.

[21] Appl. No.: 323,205

[22] Filed: Mar. 13, 1989

Related U.S. Application Data

[63] Continuation of Ser. No. 114,830, Oct. 30, 1987, abandoned.

[51] Int. Cl.$^5$ .......................... B26D 1/24; B23D 19/04
[52] U.S. Cl. ........................................ 83/479; 83/481; 83/492; 83/498; 83/552
[58] Field of Search ................. 83/552, 571, 479, 481, 83/492, 498, 499, 699

[56] References Cited

U.S. PATENT DOCUMENTS

| | | | |
|---|---|---|---|
| 3,513,743 | 8/1967 | Montguire | 83/552 X |
| 3,727,503 | 4/1973 | Braner et al. | 83/479 |
| 3,863,537 | 2/1975 | Nuelsman | 83/699 X |
| 4,236,431 | 12/1980 | Gawlik et al. | 83/479 |
| 4,265,155 | 5/1981 | Lopez et al. | 83/479 |
| 4,327,620 | 5/1982 | Greinke et al. | 83/479 |
| 4,346,635 | 8/1982 | Krauss et al. | 83/479 |

FOREIGN PATENT DOCUMENTS 1476988  6/1977  United Kingdom .

Primary Examiner—Frank T. Yost
Assistant Examiner—Rinaldi Rada
Attorney, Agent, or Firm—James D. Hall

[57] ABSTRACT

A slitter which includes multiple spaced pairs of arbors pivotally mounted to the slitter frame. Each pair of arbors includes cutter assemblies and is alignable with a shiftable bearing housing shiftably mounted to the frame. A drive member is fixedly connected to the bearing housing for correlative shiftable movement and causes correlative rotative movement of one pair of arbors.

4 Claims, 4 Drawing Sheets

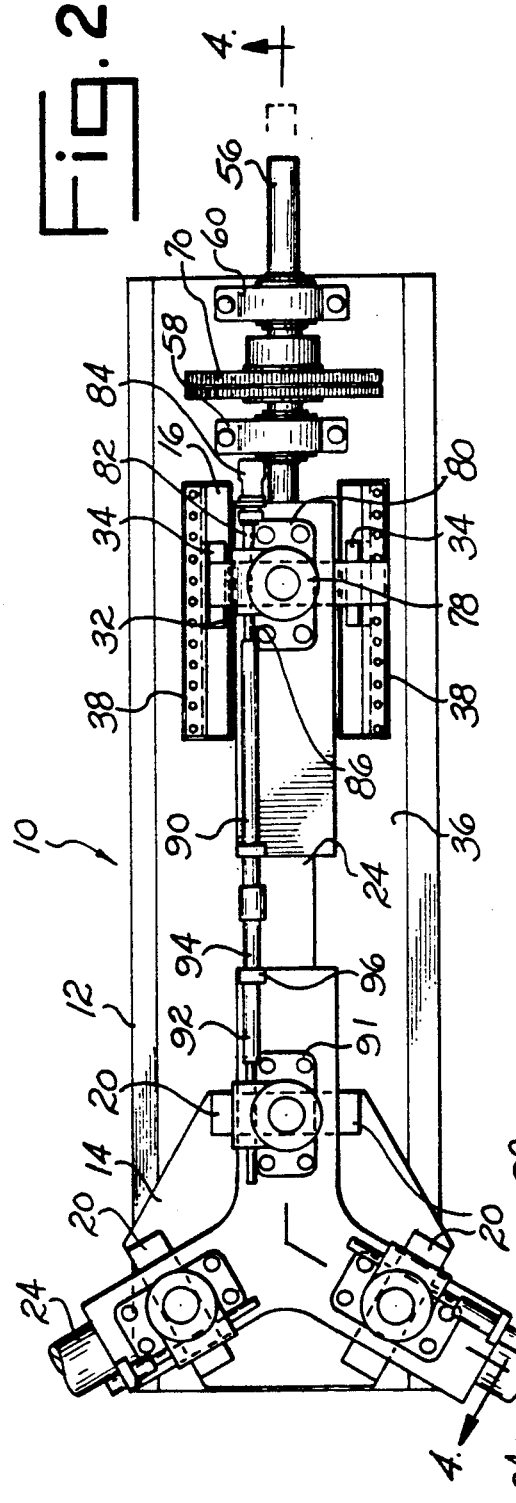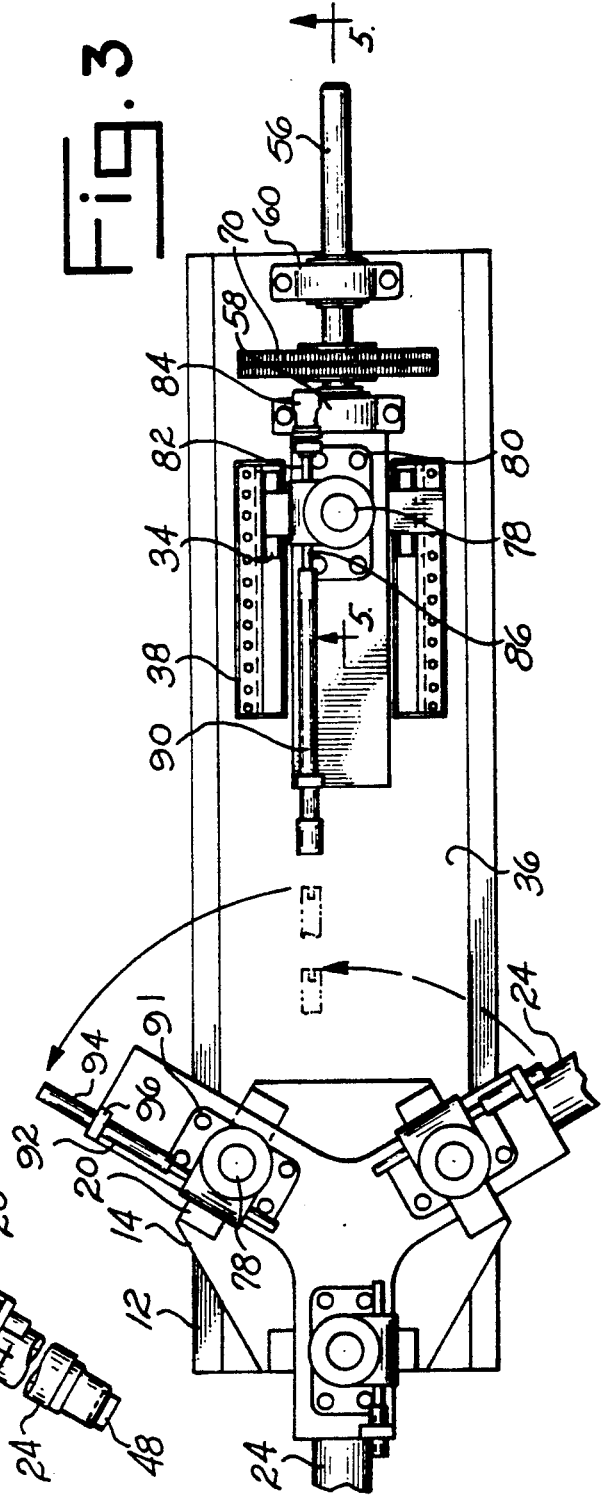

SHIFTABLE DRIVE TURRET SLITTER

This is a continuation of co-pending application Ser. No. 114,830 filed on Oct. 30, 1987 now abandoned.

SUMMARY OF THE INVENTION

This invention relates to slitting apparatus and has application to a slitter having a shiftable drive member which allows use of different length arbors.

Previous turret slitters were limited in that the overall length of the pairs of cutter-carrying arbors had to be generally equal due to the use of a fixed arbor drive shaft and the desirability of narrow outboard bearing sleeves. An example of a prior adjustable turret slitter is shown in U.S. Pat. No. 3,727,503, which is incorporated herein by reference.

The turret slitter of this invention includes a drive shaft which is fixedly mounted to the outboard bearing sleeve which engages the arbor. The drive shaft shifts with the bearing sleeve to allow different length arbors to be rapidly and easily accommodated.

It is a principal object of this invention to provide for an improved slitter which carries multiple pairs of arbors.

Another object of this invention is to provide for a slitter which accommodates arbors of varying lengths.

Another object of this invention is to provide for a slitter which has a shiftable drive shaft to accommodate arbors of various lengths.

Other objects of this invention will become apparent upon a reading of the following description.

BRIEF DESCRIPTION OF THE DRAWINGS

A preferred embodiment has been depicted for illustrative purposes wherein:

FIG. 2 is a top plan view of the slitter with one pair of arbors in the operative position.

FIG. 3 is a top plan view of the slitter with the shiftable drive retracted and the arbors being indexed.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize the invention.

Figure 1:
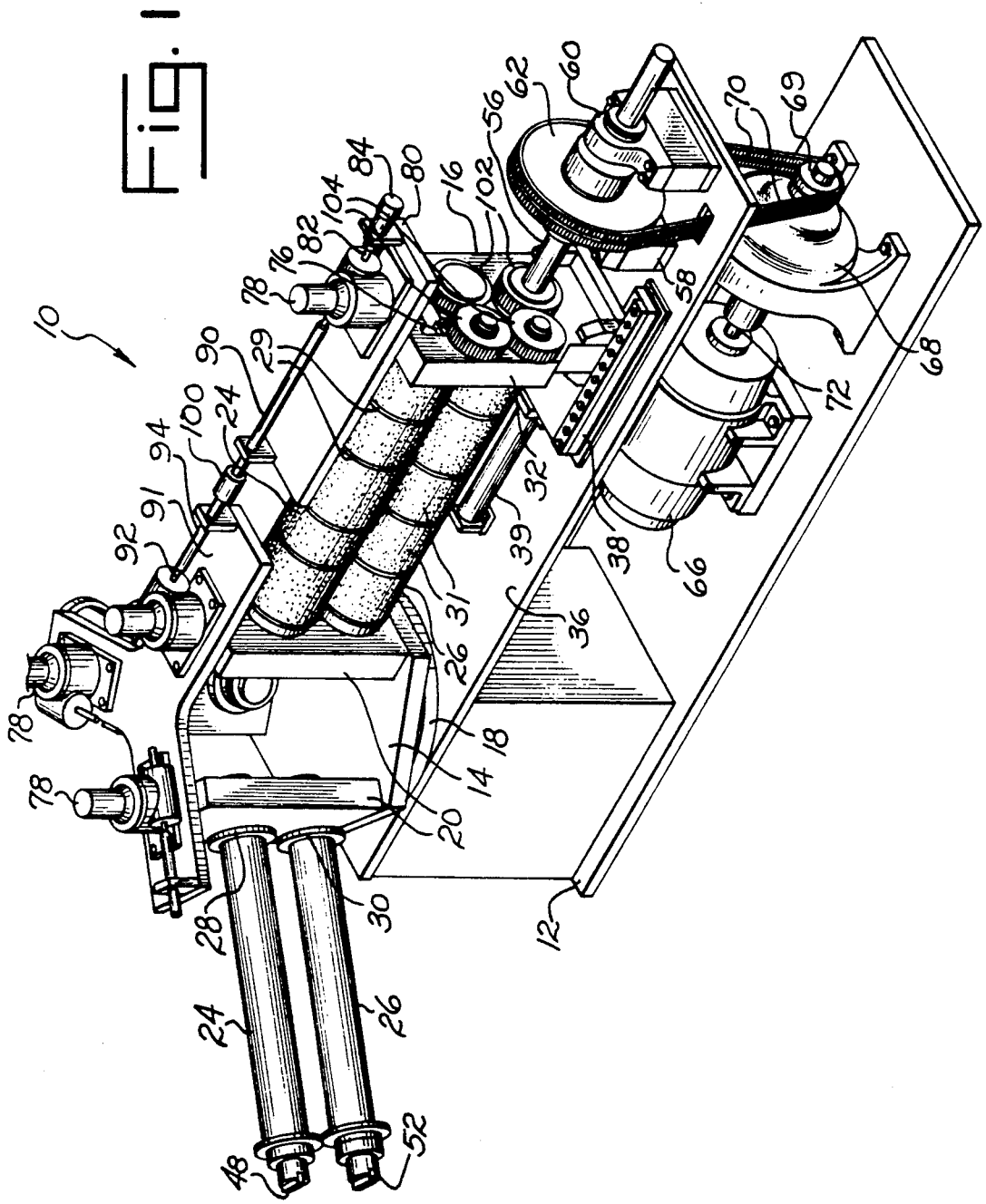
FIG. 1 is a perspective view of the shiftable drive turret slitter of this invention.
Figure 4:
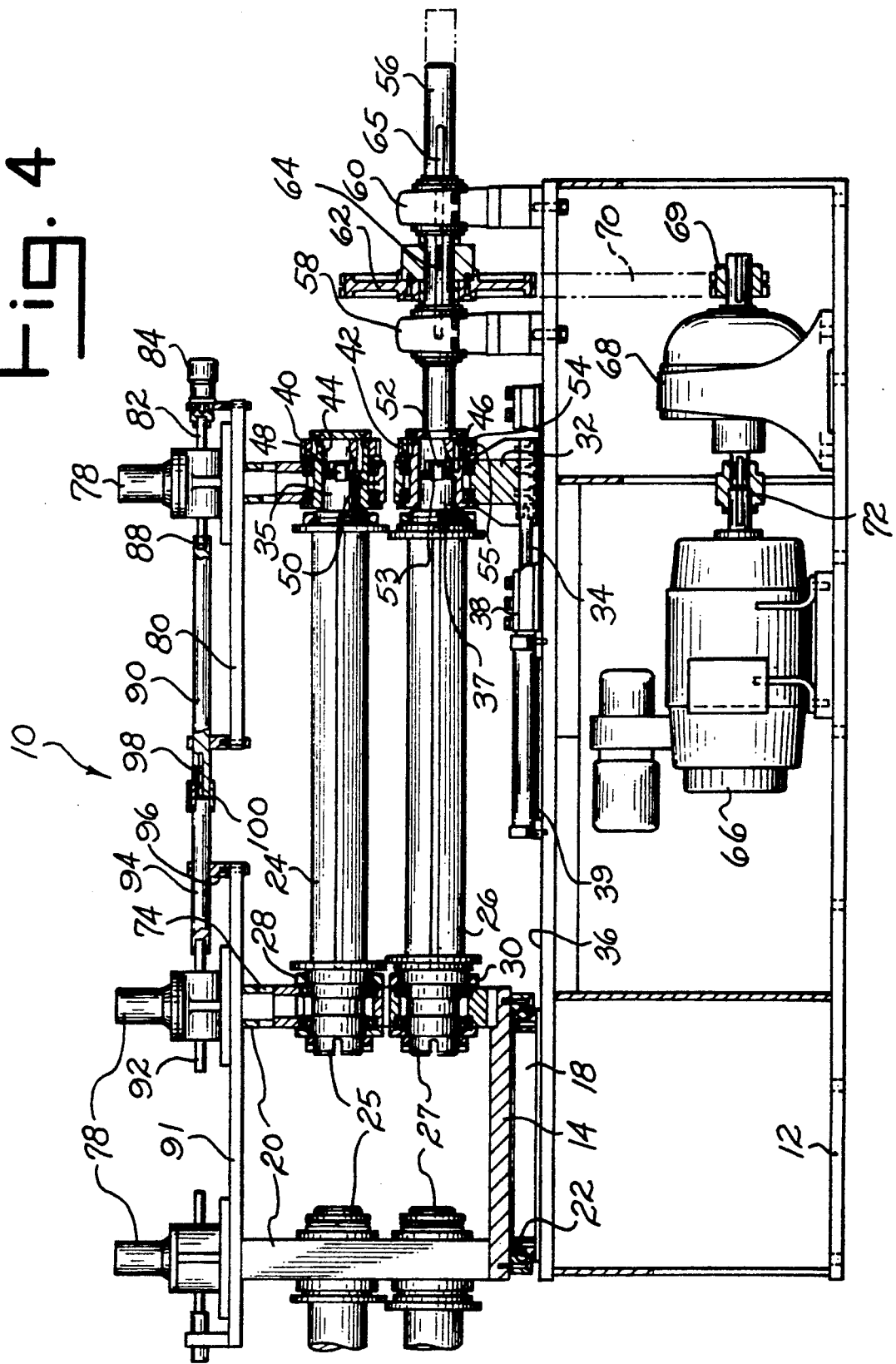
FIG. 4 is a fragmentary sectional view taken along line 4—4 of FIG. 2.

Referring now to the drawings, reference numeral 10 refers generally to the slitting apparatus of this invention. Slitter 10 includes a frame 12 defined by table 36 which carries bearing housings 14 and 16. Inboard bearing housing 14 includes a turntable 18 which carries a plurality of upright bearing blocks 20 and is journalled for rotative movement about its axis by bearings 22 (FIG. 4). Bearing blocks 20 are preferably equiradially positioned about the axis of rotation of turntable 18 and each carries a pair of arbors 24 and 26 which extend outwardly of the blocks. Each arbor 24, 26 has an end 25, 27 journalled in a bearing 28, 30 respectively of its supporting bearing block 20. Arbors 24 and 26 carry cutter and spacer assemblies 29, 31, which serve to slit the steel or other material passing between the arbors. The construction and operation of slitter 10 as thus far described is like the slitter disclosed in U.S. Pat. No. 3,727,503, which has been incorporated herein by reference.

Outboard bearing housing 16 is spaced from bearing housing 14 and includes a bearing block 32. Bearing block 32 includes spaced parallel slide bars 34 which rest upon and are retained within spaced guides 38 attached to frame 12 so as to enable bearing housing 16 to be shifted towards and away from bearing housing 14. Bearing block 32 carries bearings 40 and 42 which are positioned to journal arbors 24 and 26 as the arbors are brought into alignment as shown in FIG. 4. Bearing 40 includes a rotative sleeve 44 and bearing 42 includes a rotative sleeve 46. End 35 of each arbor 24 includes a drive key 48 which interlocks with a slot 49 in wall part 50 which is connected to sleeve 44. End 37 of each arbor 26 includes a drive key 52 which interlocks with a slot 53 in wall part 54 which is connected to sleeve 46 by a key 55 and to a drive shaft 56.

Drive shaft 56 is connected to wall part 54 and extends axially outwardly of sleeve 46 where it is supported in a horizontal position by spaced support bearing blocks 58, 60. Drive shaft 56 is connected to a drive sprocket 62 located restrictively between bearing blocks 58 and 60. Sprocket 62 includes a key 64 which fits slidably within a longitudinal slot or keyway 65 in shaft 56 to allow the shaft to slide longitudinally through the sprocket. A drive motor 66 is connected through coupler 72 to a transmission and gear reducer 68 which drives a sprocket 69. A belt 70 is trained about drive sprocket 62 and sprocket 69 so that upon activation of motor 66, sprocket 62 and connected shaft 56 are caused to rotate.

Bearings 28 and 40 are shiftably carried within slotted openings 74 in bearing blocks 14 and 16 so as to be movable up and down with respect to bearings 30 and 42 which are fixedly positioned within their respective bearing blocks. Bearings 28 and 40 are retained within their respective bearing blocks by guide plates 76. A jackscrew assembly 78 is mounted to the top of each bearing block 20 and 32. One jackscrew assembly 78 is connected to bearing block 32 through mounting plate 80 and includes a drive shaft 82 which is connected at its outboard end to motor 84 and which upon rotation causes the raising and lowering of bearings 40. The inboard end 86 of drive shaft 82 is connected at 88 to a cross-over shaft 90. The jackscrew assemblies 78 connected to bearing blocks 20 by mounting plate 91 each include a driven shaft 92 connected to shaft 94 which is journalled in a support 96 which is connected to mounting plate 91. As a selected pair of arbors 24, 26 is brought into alignment with bearings 40, 42, shaft 94 associated with such arbors is operatively connected to cross-over shaft 90 through a key 98 and sleeve 100 coupler carried by shaft 90 as shown in FIG. 4. Jackscrew assemblies 78 are of common usage to vary the spacing between arbors.

Gears 102 carried by bearing block 32 mesh with gears 104 carried by sleeves 44 and 46 so that upon rotation of one sleeve there will be corresponding rotation of the other sleeve in the opposite direction for any operative position of sleeve 44.

Figure 5:
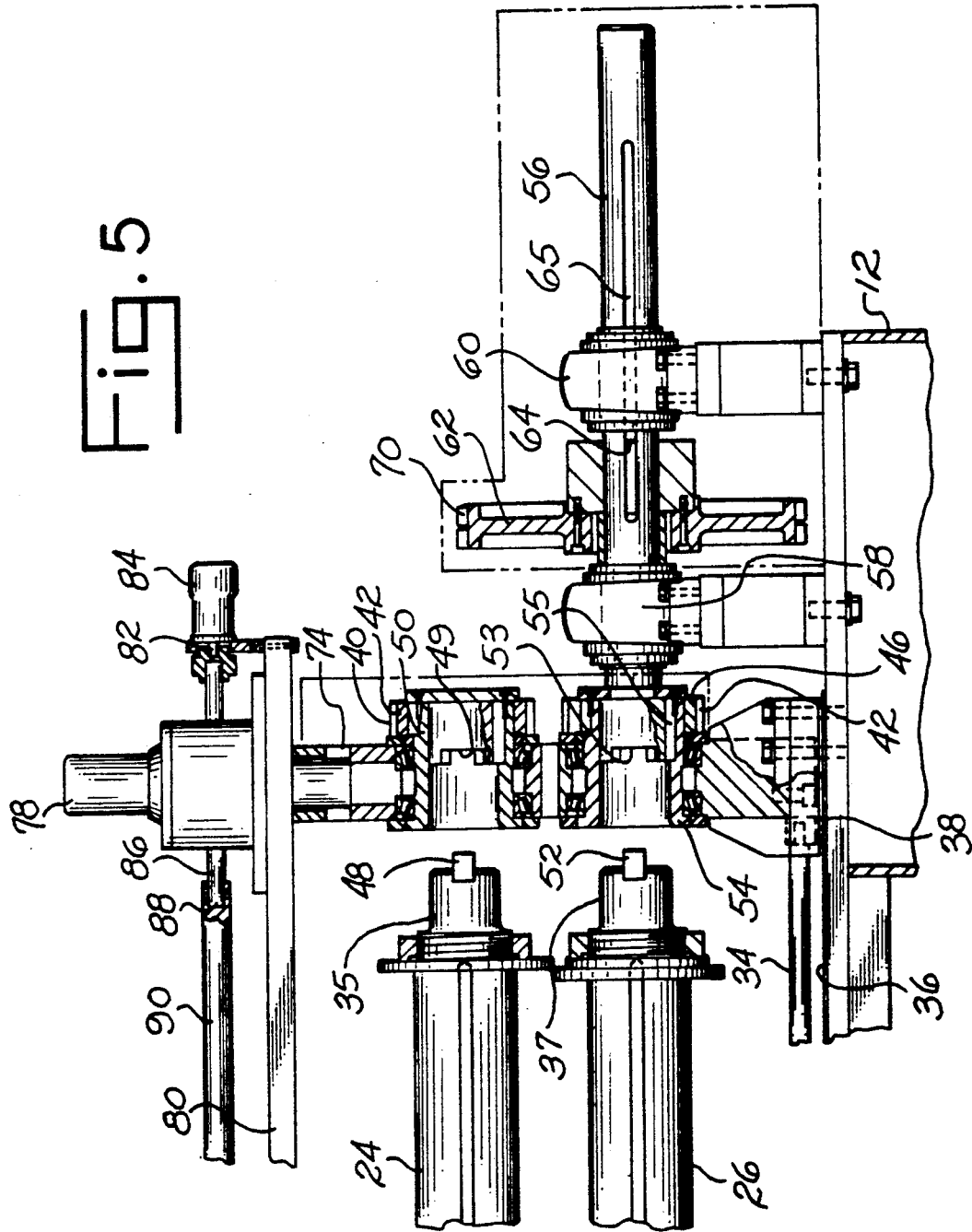
FIG. 5 is a fragmentary sectional view taken along line 5—5 of FIG. 3.

Slitter 10 operates as follows. Coiled metal (not shown) is fed by an uncoiler (not shown) between a selected pair of power driven arbors 24 and 26 which have been equipped with knives 29 and spacers 31 in a preset orientation. After slitting, the slit material is wound up on a recoiler (not shown) in conventional fashion. Bearing blocks 20 (three shown for illustrative purposes) each carry a pair of arbors 24 and 26 which may be of the same or of varying lengths. While one slitting operation is performed, workmen may set up knives 29 and spacer 31 assemblies on a pair of arbors 24, 26 not currently in use. After completion of the slitting operation, bearing block 32 and connected drive shaft 56 are shifted outwardly along guides 38 by a pneumatic piston 39 to its extended position as seen in FIG. 5. Bearing housing 14 is then rotated at turntable 18 to bring the newly prepared arbors 24 and 26 into alignment with sleeves 44 and 46. Bearing block 32 and its connected drive shaft 56 are then shifted by piston 39 towards bearing housing 14 until arbor keys 48 and 52 mate with sleeve wall slots 49 and 53 respectively to its retracted position as seen in FIG. 4. Motor 66 is then activated to turn drive shaft 56 and arbors 24 and 26 to perform the next slitting operation. Due to the extended length of guides 38 and the shiftable drive shaft 56, various lengths of pairs of arbors 24, 26 may be accommodated for use with slitter 10.

It is understood that the above description does not limit the invention to the precise form disclosed, but may be modified within the scope of the following claims.

We claim:

1. In a slitter which includes a frame, first and second bearing housings carried by said frame, said first bearing housing pivotally connected to said frame and carrying two or more spaced pairs of arbors having first and second ends, each pair of arbors connected at its said first end to said first bearing housing, each pair of arbors being alignable with said second bearing housing upon pivotal movement of said first bearing housing, each arbor pair second end supported by said second bearing housing when aligned with the second bearing housing, and drive means for rotating at least one of the arbors of each pair of arbors when aligned with said second bearing housing, said second bearing housing including means for shifting the second bearing housing relative to said frame and first bearing housing between an operative position aligned with a selected pair of said arbors and a standby position spaced from said selected pair of arbors, the improvement wherein said drive means includes a drive shaft shiftably supported above said frame, said drive shaft fixedly connected to said second bearing housing for longitudinal movement in its entirety with said second bearing housing when the second bearing housing is shifted between said operative and standby positions, said drive shaft including means for engaging one of said aligned arbors when the second bearing housing is in its said operative position for effecting rotation of the aligned arbors.

2. The slitter of claim 1 wherein said drive means further includes a motor, said motor including gear means operatively connected to said drive shaft for effecting rotative movement of the drive shaft, said drive shaft slidably connected to said gear means whereby the drive shaft shifts relative to said motor and gear means when the drive shaft shifts along with said second bearing housing.

3. The slitter of claim 1, wherein said drive means includes a drive motor and means connecting said drive motor to said drive shaft for imparting rotation to the shaft, said drive shaft being shiftable relative to said drive motor connecting means when said second housing is shifted between its operative position and its standby position.

4. In a slitter which includes a frame, first and second bearing housings carried by said frame, said first bearing housing pivotally connected to said frame and carrying two or more spaced pairs of arbors having first and second ends, each pair of arbors connected at its said first end to said first bearing housing, each pair of arbors being alignable with said second bearing housing upon pivotal movement of said first bearing housing, each arbor pair second end supported by said second bearing housing when aligned with the second bearing housing, and drive means for rotating at least one of the arbors of each pair of arbors when aligned with said second bearing housing, said second bearing housing including means for shifting the second bearing housing relative to said frame and first bearing housing between an operative position aligned with a selected pair of said arbors and a standby position spaced from said selected pair of arbors, the improvement wherein said drive means includes a drive shaft shiftably supported above said frame, said drive shaft fixedly connected to said second bearing housing wherein the drive shaft shifts along with said second bearing housing, said drive shaft including means for engaging one of said aligned arbors when the second bearing housing is in its said operative position for effecting rotation of the aligned arbors, said second bearing housing including a first sleeve and a second sleeve operatively connected to said first sleeve, said sleeves constituting means for rotatably carrying each pair of arbors, said drive shaft fixedly connected to said first sleeve.

* * * * *